June 17, 1930.  L. STALDER  1,764,363
ELECTRICAL MEASURING INSTRUMENT
Filed Feb. 14, 1928  2 Sheets-Sheet 1
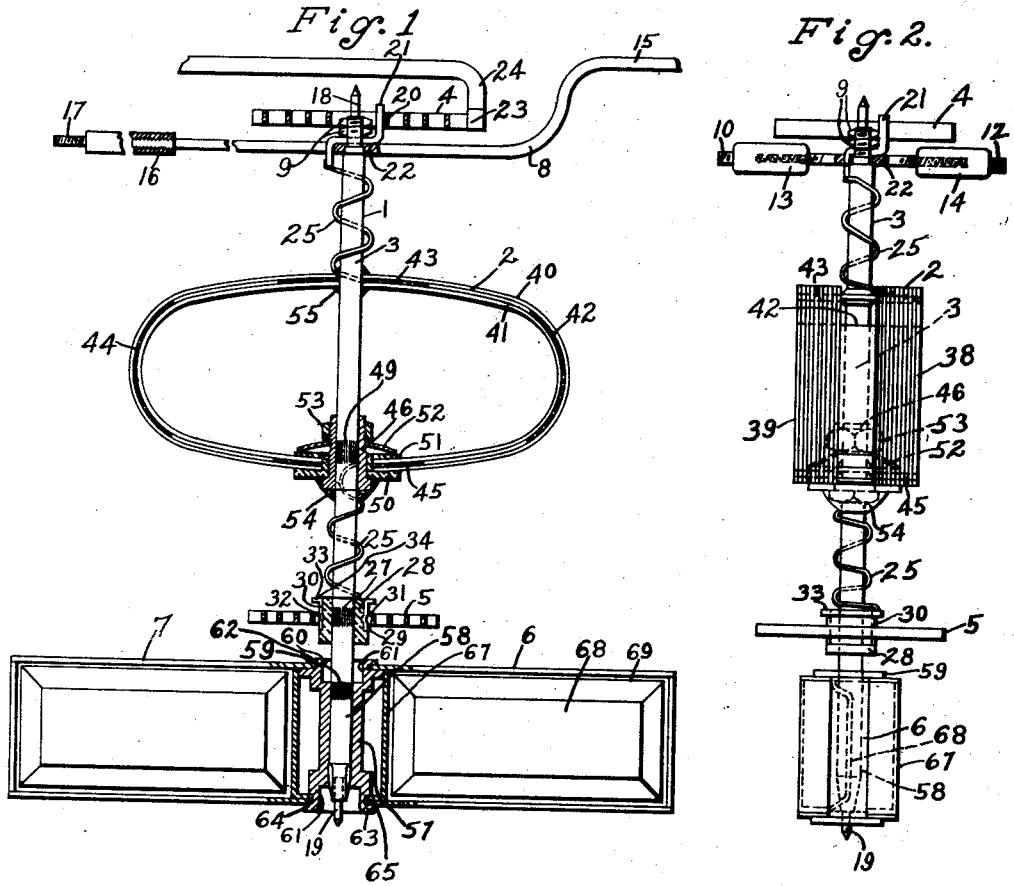
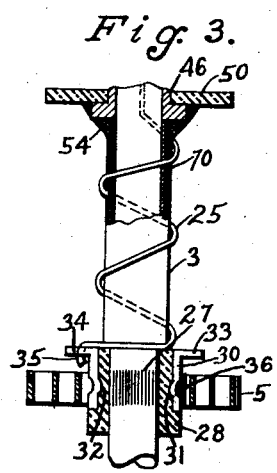
INVENTOR
Louis Stalder
BY
*Wesley E. Carr*
ATTORNEY

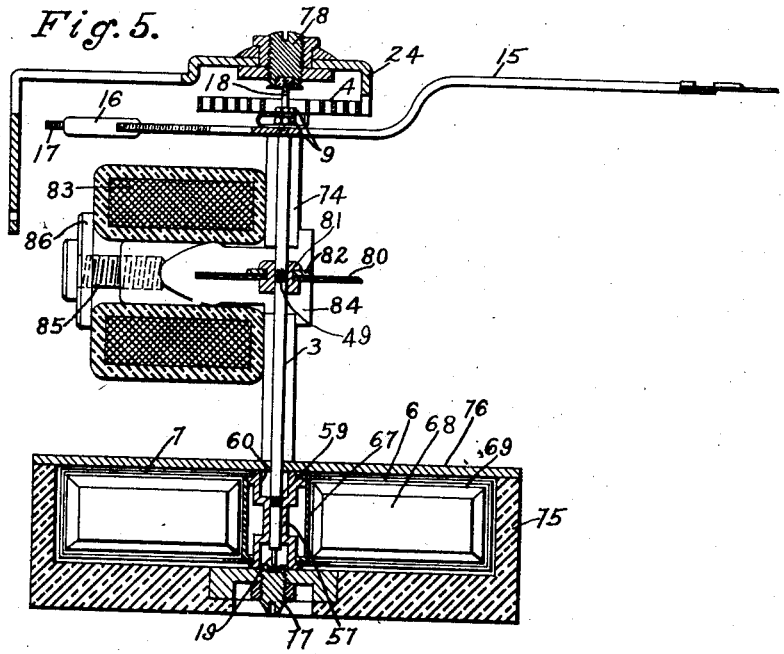
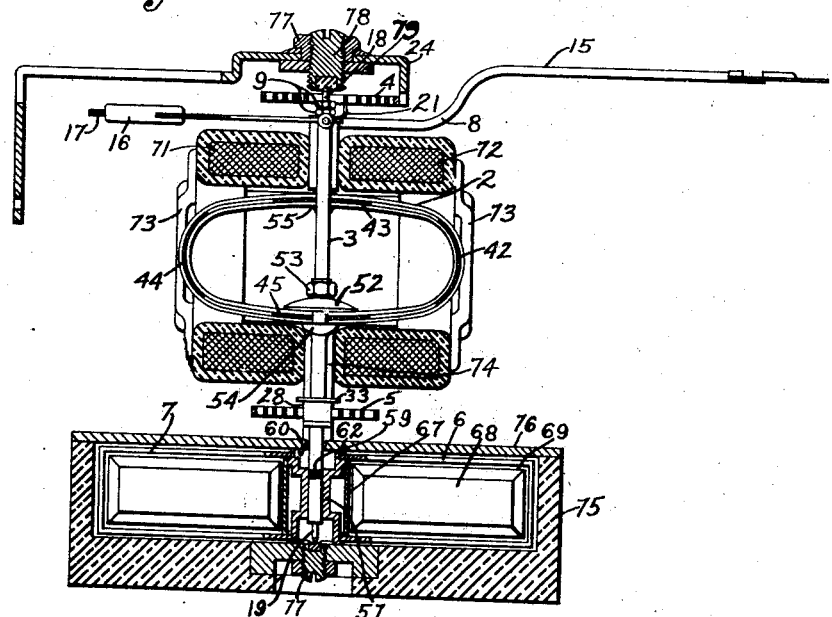
INVENTOR
Louis Stalder
BY
ATTORNEY

Patented June 17, 1930

1,764,363

UNITED STATES PATENT OFFICE

LOUIS STALDER, OF TURTLE CREEK, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed February 14, 1928. Serial No. 254,243.

My invention relates to electrical measuring instruments and particularly to the moving elements comprising the armatures of such instruments.

Broadly speaking, my invention resides in an improved type of apparatus to be mounted on the spindle of an electrical measuring instrument, and the main purpose of my invention is to decrease the weight of the armatures of such instruments with resultant increase in the efficiency and capacity thereof.

My invention resides in the details of construction which may be more readily understood by reference to the accompanying drawing, taken in connection with the following description.

Figure 1 is a view, partially in elevation and partially in section, of the armature of an electrical measuring instrument having essential features of my invention embodied therein.

Fig. 2 is a side elevational view of the armature shown in Fig. 1,

Fig. 3 is a view, partially in cross section, of the conducting spring portion of the armature shown in Fig. 1.

Fig. 4 is a vertical cross-sectional view of an electrical measuring instrument having a movable element constructed in accordance with my invention, and Fig. 5 is a view, similar to Fig. 4, of an ammeter having portions thereof constructed in accordance with my invention.

An armature of an electrical measuring instrument, such as an ammeter, voltmeter, wattmeter, or similar instrument, in which a movable coil or bobbin 2 is utilizable, comprises a rotatable spindle 3 the torque of which is suitably balanced, as by coil springs 4 and 5, and the movement of which is suitably damped as by vanes 6 and 7.

A pointer 8 of the usual construction, shown partially in Fig. 1 is suitably mounted on the spindle 3, as by nuts 9 that are suitably threaded to the upper portion thereof. The pointer 8 is balanced in the usual and well-known manner by laterally extending members 10 and 12 that are provided with weights 13 and 14 adjustably mounted on said members. The indicating portion 15 of the pointer 8 is counter-balanced by a weight 16 that is suitably threaded to a portion 17 of the member 8 extending in an opposite direction from the portion 15.

The upper and lower ends of the spindle 3 are provided with openings in which are mounted pivots 18 and 19 adapted to support the spindle 3 in suitably shaped bearings (not shown) that are preferably jewels.

Any turning motion imparted through the coil or bobbin 2 to the armature 1 is resiliently restrained by the springs 4 and 5 which also function as a conducting path for current that traverses the windings of the bobbin 2.

The spring 4 has its inner end 20 soldered or otherwise suitably secured to a projection 21 extending from a bushing 22 that is mounted between the nuts 9 and the pointer 8. The outer end 23 of the spring 4, preferably is secured to an adjustable member 24 that is suitably mounted on the stationary structure of the instrument (not shown). The adjustable member 24 comprises the well-known zero adjuster that is familiar to those skilled in the art.

The electrical conducting circuit of the armature comprises the adjustable member 24, the upper spring 4, the bushing 22 and conductor 25 that is coiled around the spindle 3 both above and below the bobbin 2 and which is connected to opposite terminals thereof. Below the bobbin 2 conductor 25 is electrically connected to the spring 5 in a novel manner, in accordance with my invention.

Heretofore, the lower spring 5 has been connected to a bushing that was mounted on the shaft 3 through insulating members known to the trade as "spaghetti". Instrument men have experienced some trouble in the use of their measuring instruments constructed in such manner and they have noticed that in the course of time, the zero positions of the instruments shift or change. I have found that this action occurs because of the fact that the spaghetti insulation between the bushing and the armature does not prevent the latter from slipping with respect to the spring that is permanently secured to the bushing. In accordance with my invention the aforesaid slipping movement of the armature is prevented by utilizing structure of the character hereinafter described.

To this end, I corrugate a surface 27 of the spindle 3 with axially extending milled projections. On such corrugated surface, I mount an insulating bushing 28 that preferably comprises a fibrous material. The inner periphery of the bushing 28 cooperatively engages the milled surface of the corrugated portion 27 and may be said to be substantially fixed in position with respect to the spindle 3 because of such cooperation. The bushing 28 is preferably provided with a portion 29 of slightly reduced diameter for the reception of another bushing 30 that is preferably of an electrically conducting material that may be readily tinned.

The inner contour of the bushing 30 preferably conforms substantially to the outer contour of the portion 29 of the bushing 28 so that the former is adapted to be fixed in position with respect to the latter by "prick-punched" indentations 31 and 32.

The bushing 30 is preferably provided with a rim or flange 33 having a slot or opening 34 that is adapted to receive an end portion 35 of the conductor 25. In assembling the conductor 25 and the bushing 30, the end portion 35 of the conductor 25 is pressed into the slot 34 of the flange 33 and is thereafter soldered therein, the whole surface of the bushing 30 having been previously tinned, as hereinbefore mentioned.

To the end that the spring 5 may be electrically connected to the conductor 25, the inner end thereof is secured to the bushing 30 in any suitable manner, as, for example, by a drop of solder that secures the end 36 to the bushing 30. In such manner, the spring 5 has its end 36 mechanically fixed with respect to the spindle 3. The corrugations 27 on the spindle 3 effectually prevent the fiber bushing 28 from slipping with respect to the spindle 3.

The bobbin 2 comprises an especially lightweight coil by virtue of its novel construction in accordance with my invention. Heretofore, coils for a similar purpose have been wound of silk-covered copper wire that has been wound on a frame, that is, in turn, mounted on a spindle corresponidng to the spindle 3. Such bobbins, while representing the construction representative of the latest advance known in the art, are very heavy for the same number of ampere turns, in comparison with a bobbin constructed in accordance with my invention.

In practicing my invention, the bobbin 2 comprises preferably a plurality of sections 38 and 39 that are preferably symmetrically disposed on the respective sides of the spindle 3. The sections 38 and 39 comprise a continuous winding of enamel-covered copper wire. The sections are of sufficient number of turns to form at least two layers 40 and 41.

In the process of manufacture, the bobbin 2 is wound on a properly shaped form. The inner layer 41 is first wound, then strips of cloth, for example, taffeta silk, 42, 43, 44 and 45, are distributed between the sectons 38 and 39, preferably in the positions indicated in the drawing, and the next layer 40 of wire is wound over such strips. The whole coil 2, including the taffeta silk strips 42, 43, 44 and 45, are impregnated by a light-weight binding cement, such as celluloid cement. Such cement fills up the crevices in the silk portions and renders them desirably stiff. The celluloid also binds the layers 41 and 40 of wire to the silk portions and forms a unitary structure of both sections 38 and 39 of the bobbin 2.

Suitably shaped openings between the sections 38 and 39 are provided in the silk strips 43 and 45 for the reception of the spindle 3 and the retaining members for securing the bobbin 2 to the spindle 3.

A bushing 46 is mounted on the spindle 3 and is prevented from slipping by corrugations 49 in a manner hereinbefore explained. An insulating washer 50, preferably of fibrous material, is mounted on the bushing 46. The opening in the silk strip 45 is filled by the inner portion of the washer 50, and the bobbin 2 is retained in position preferably by a fiber washer 51 that is suitably held in position by a resilient washer 52 and a nut 53 that is preferably threaded to the bushing 46. The spring washer 52 is preferably of phosphor bronze and the bushing 46 and the nut 53 are preferably of aluminum because of the low specific gravity of such materials. After the bushing 46 and the bobbin 2 are placed in position, the joint between the bushing 46 and the spindle 3 may be covered with celluloid cement 54 for retaining the two in fixed position with respect to each other. The joint between the opening in the silk strip 43 and the spindle 3 may also be coated with celluloid cement 55 to bind them together.

The above described method of constructing the bobbin 2 materially reduces the weight and heating of the bobbin 2 for a given number of ampere turns with respect to the most improved method of constructing such bobbins now known to the art. A very much higher space factor is obtainable by discarding the old silk-covered wire and replacing it by enamel-covered wire made possible by my novel method of construction.

Having described the novel features of construction of the mounting of the spring 5 to the spindle 3 and the novel construction of the bobbin 2 and its mounting on the spindle 3, I will now proceed to set forth the novel structure associated with the mounting of the damping vanes 6 and 7 on the spindle 3. I consider the construction of the latter to be most effective for reducing the weight of the armature 1.

Heretofore, the movable elements of electrical measuring instruments have been damped by aluminum vanes that were suitably mounted on the spindles of such instruments. In a representative device for such purpose, a solid aluminum drum was provided with suitably shaped vanes projecting, from opposite sides thereof, into a closed air chamber. The cooperation of such vanes with the entrapped air in the chamber effectually damped the movement of the armature and permitted a reading of the pointer even with rapid changes in the quantity being measured. Such devices were entirely satisfactory from a damping point of view but they materially added to the weight of the entire armature assembly.

In practicing my invention, I utilize the same general principles for damping the armature as have heretofore been used but I materially reduce the weight of such structure by forming and mounting the vanes 6 and 7 on the spindle 3 in a novel manner.

In accordance with my invention, a bushing 57 of substantially spool shape is mounted on a lower portion 58 of the spindle 3 that is preferably provided with a corrugated inner surface 59 for the purpose of preventing slippage of the bushing 57 with respect to the spindle 3, as hereinbefore set forth.

The bushing 57, preferably, comprises end portions 60 and 61 that are somewhat larger in diameter than the diameter of the main portion of the core and are preferably cored out. Before assembly, the end portions 60 and 61 are provided with projections 62 and 63 that extend parallel to the axis of the core. These portions 62 and 63 are spun over upon inwardly extending projections 64 and 65 of the vanes 6 and 7 after the latter are assembled into position, as will be more fully set forth hereinafter.

The vanes 6 and 7 preferably comprise a single "formed" sheet of relatively thin aluminum that is pressed into shape and bent to form the said vanes. After the bending operation, the portion between the two vanes is provided with a cup 67 that provides an inner central chamber which has heretofore been solid aluminum, but is now nothing more than an air-filled chamber. The cup 67 is provided with a circular opening in its lower portion that is adapted to conform substantially to the shape of the portion 61 of the bushing 57.

In assembling the apparatus, the cup 67 is placed in position between the end portions of the bushing 57. The member forming the vanes 6 and 7 is then placed in position, the upper projection 62 being pressed into position with respect to the rim 60 of the bushing 57. After the cup 67 and the projections 64 and 65 have been snapped into position, the portions 62 and 63 of the bushing 57 are spun over, in a well-known manner, to hold the projections 64 and 65 firmly in position.

The vanes 6 and 7 preferably comprise an indented section 68 in a plane offset with respect to the plane 69 of the center of the vane. In this manner, air pockets for the entrapment of air are provided on both sides of the vanes.

The space on the spindle and between the bushings 28 and 46 is preferably covered with layers 70 of insulating material, such as Japan paper, for the purpose of insulating the spindle 3 from the conductor 25 that is wound thereon.

In Fig. 4, a measuring instrument is shown having an armature constructed in accordance with my invention hereinbefore set forth. For use as a voltmeter, the coil 2 is preferably connected in series-circuit relation with stationary windings 71 and 72 that are oval in shape and provide a flux field for the coil 2. The windings 71 and 72 are mounted in a frame 73 that, in turn, may be supported by a member 74. The air vanes 7 are disposed in a chamber 75 having a removable cover 76. A bearing 77 is mounted in the bottom of the chamber 75 and forms a support for the pivot 19, as set forth above. The upper pivot 18 is also provided with a bearing 78 that is mounted in a member 79 that in turn is supported by the main frame of the instrument.

For use as a wattmeter, the arrangement of Fig. 4 may be utilized in which case the coil 2 is preferably connected in parallel-circuit relation with the main line conductors and the windings 71 and 72 are preferably connected in series-circuit relation with the main line conductors (not shown).

In Fig. 5 is shown an ammeter having a magnetizable vane 80 that is mounted on the shaft 5, in lieu of the coil 2 shown elsewhere. The vane 80 is secured to a bushing 81 that is spun over a washer 82 to retain the vane 80 in position.

The magnetizable vane 80 is moved by the magnetic attraction of a field that emanates from a coil 83 energized in accordance with the current traversing a circuit. The coil 83 is retained in position on the support 74 by the cooperation of a frame 84 with a screw 85 and washer 86. The bushing 81, mentioned above, is mounted on the shaft 3 similarly to the mounting of the bushing 28 on the shaft, as heretofore set forth.

I have shown my invention as applicable to a voltmeter, wattmeter and ammeter. It will be readily understood that it is equally applicable to frequency meters, power-factor meters, and similar instruments.

All of the features hereinbefore mentioned, and particularly the construction of the damping vanes and the bobbin 2, have been directed to the reduction of the weight of the entire armature structure. Such features as have been previously mentioned not only improve the operation of the device with respect to function, but they also greatly improve the efficiency and load capacity of a measuring instrument having an armature constructed in accordance therewith.

For example, wattmeters, because of the heating due to the resistance losses in the conductors of the bobbins, have presented a problem to engineers for their ventilation or cooling. It has been necessary, in such devices, to provide ventilating ducts or openings in the casings to keep such coils cool. In my device, however, no such ventilating ducts are necessary, but a completely air-tight casing may be utilized for a wattmeter having a higher rating than the old devices, by virtue of the low loss and relatively high number of ampere turns available because of the reduction in weight of the entire assembly. Furthermore, the diameter of the wire entering into the movable coil construction is much less than has heretofore been the practice.

It will, of course, be understood that changes may be made in the detailed features of my invention without departing from the spirit and scope thereof. I desire to include all such modifications within the scope of the appended claims.

I claim as my invention:

1. The combination with a plurality of damping vanes and a spindle, of means for mounting said vanes on said spindle comprising a hollow-walled cylindrically-shaped member with a ridge at each end, the inner periphery of said member cooperatively engaging said spindle and the outer periphery of said ridges cooperatively engaging said vanes.

2. The combination with a plurality of damping vanes and a spindle, of means for mounting said vanes on said spindle comprising a hollow-walled cylindrically-shaped member having a ridge at each end, the inner periphery of said member cooperatively engaging said spindle and the outer periphery of said ridges having portions cooperatively engaging projections of said vanes.

3. The combination with a plurality of damping vanes and a spindle, of means for mounting said vanes on said spindle comprising a hollow-walled cylindrically-shaped member having a shoulder at each end, the inner periphery of said member cooperatively engaging axially aligned ridges on said spindle and the outer periphery of said shoulders cooperatively engaging said vanes.

4. In combination, a spindle having a corrugated portion, an insulating bushing mounted on said corrugated portion, a bushing having a flange mounted on said insulating bushing, said flange having an opening, a conductor disposed in, and electrically connected to, said opening, and a coiled spring mechanically secured to said bushing whereby a mechanical coupling is effected between said spring and said spindle and an electrical-circuit coupling is effected between said conductor and said spring.

5. In combination, a spindle having a corrugated surface portion, a hollow-walled bushing of substantially spool-shape mounted on said spindle at said corrugated surface portion, and a plurality of vanes mounted on said bushing in inserts in the rims of said spool.

6. The combination with a spindle, and a damping vane carried thereby, of means for securing said vane to said spindle, said means comprising a bushing carried by said spindle and a hollow-walled cylindrical member coacting therewith.

7. In an electrical measuring instrument, the combination with a pointer, of an armature for said pointer including a pivoted spindle, a light-weight coil of enamel-covered wire mounted on said spindle, and a light-weight damping system secured to said spindle, said damping system including a hollow-wall bushing.

8. The combination with a spindle, and a damping vane, of means for securing the vane to the spindle including a tubular element carried by the spindle and a cylindrical element disposed about the tubular element in radially-spaced relation to portions thereof to therewith constitute a hollow-walled bushing.

9. The combination with a spindle, and a damping vane, of means for securing the vane to the spindle including a tubular element carried by the spindle and a cylindrical element disposed about the tubular element in radially-spaced relation to portions thereof to therewith constitute a hollow-walled bushing, one of said elements having a portion extending radially toward the other to space the elements in proper relation.

10. The combination with a spindle having axial corrugation thereabout, a tubular element having a portion tightly embracing the spindle and held in position by said corrugations and having end portions of different diameters providing shoulders, a cylindrical element surrounding the tubular element in radially spaced relation thereto and held in position by certain of said shoulders, and a damping vane having supporting portions positioned by certain of said shoulders, swaged portions of the tubular element holding said cylindrical element and said vane in position.

11. In combination, a spindle, and insulating bushing thereon, a metal member secured to the bushing in spaced relation to the spindle, a conductor connected to the metal member and a spiral conducting metal spring surrounding the axis of the spindle and connected to said metal member for mechanically controlling movement of the spindle and constituting a portion of the circuit of said conductor.

12. In combination, a spindle, coil elements at opposite sides thereof, secured thereto at a plurality of positions and means for securing said elements to the spindle at one of said positions including a stiff relatively thin sheet of dielectric material normal to, and through, which the spindle extends, said sheet constituting the sole support for the coil elements at said one position.

13. In combination, a coil element of closed-loop form wound of enameled wire and having adjacent to one cross-sectional area thereof, sections of substantially flat-strap form disposed in spaced quadrature relation, and a relatively thin stiff dielectric sheet bonded to all of said sections in substantially flat surface-to-surface relation thereto to hold the same in said quadrature relation.

In testimony whereof, I have hereunto subscribed my name this 10th day of November, 1927.

LOUIS STALDER.